(12) United States Patent
Fujishiro

(10) Patent No.: US 12,108,296 B1
(45) Date of Patent: Oct. 1, 2024

(54) COMMUNICATION METHOD, NODE, AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/393,282

(22) Filed: Dec. 21, 2023

Related U.S. Application Data

(63) Continuation of application No. PCT/JP2023/024390, filed on Jun. 30, 2023.

(51) Int. Cl.
*H04W 36/08* (2009.01)
*H04W 36/34* (2009.01)

(52) U.S. Cl.
CPC ........... *H04W 36/08* (2013.01); *H04W 36/34* (2013.01)

(58) Field of Classification Search
CPC ................ H04W 36/08; H04W 36/34; H04W 36/083; H04W 36/085; H04W 36/087; H04W 36/13
See application file for complete search history.

(56) References Cited

U.S. PATENT DOCUMENTS

2016/0338134 A1* 11/2016 Nagasaka ............. H04W 76/15
2020/0120552 A1    4/2020 Yang et al.

FOREIGN PATENT DOCUMENTS

WO        2022/097046 A1    5/2022

OTHER PUBLICATIONS

RP-212710 ("New WID: NR further mobility enhancements", 3GPP TSG RAN Meeting #94e, RP-212710, Dec. 6-17, 2021) (Year: 2021).*
China Telecom; "Multi Radio Multi Connectivity for Rel-18"; 3GPP TSG RAN Rel-18 workshop; Electronic Meeting; Agenda: 4.1; RWS-210143; Jun. 28-Jul. 2, 2021; pp. 1-10.
"Decision for Grant of Patent" Office Action issued in JP 2023-554074; mailed by the Japanese Patent Office on Nov. 21, 2023.
Nokia, Nokia Shanghai Bell; "Enhancements related to the conditional PSCell change" [online], 3GPP TSG-RAN WG3 Meeting #110-e; R3-205947; e-meeting, Nov. 2-12, 2020; pp. 1-2; Internet <URL:https://www.3gpp.org/ftp/tsg_ran/WG3_Iu/TSGR3_110-e/Docs/R3-20594 7.zip>.
China Telecom; "Support on MRO for SN Change Failure" [online]; 3GPP TSG RAN WG3 #109-e; R3-204896; Aug. 17-28, 2020; pp. 1-5; Internet <URL:https://www.3gpp.org/ftp/tsg_ran/WG3_Iu/TSGR3_109-e/Docs/R3-204896.zip>.
Samsung; "Multi-RAT Multi-Connectivity (MR-MC) for 5G-Advanced" [online]; 3GPP TSG RAN Rel-18 workshop; RWS-210183; electronic meeting, Jun. 28-Jul. 2, 2021; pp. 1-6; Internet <URL:https://www.3gpp.org/ftp/tsg_ran/TSG_RAN/TSGR_AHs/2021_06_RAN_Rel18_WS/Docs/RWS-210183.zip>.

* cited by examiner

*Primary Examiner* — Chi H Pham
*Assistant Examiner* — Ji-Hae Yea
(74) *Attorney, Agent, or Firm* — Studebaker & Brackett PC

(57) ABSTRACT

A communication method for a user equipment to perform wireless communication with a master node and a plurality of secondary nodes in a mobile communication system includes performing, at a master node, processing of transferring, to at least one of a plurality of secondary nodes, a control authority for performing, on a user equipment, configuration and/or control related to a coordinated operation between the plurality of secondary nodes, and performing, at the secondary node to which the control authority is transferred, the configuration and/or control related to the coordinated operation on the user equipment.

10 Claims, 12 Drawing Sheets

COMMUNICATION METHOD, NODE, AND USER EQUIPMENT

RELATED APPLICATION

The present application is a continuation based on PCT Application No. PCT/JP2023/024390, filed on Jun. 30, 2023. The content of which is incorporated by reference herein in their entirety.

TECHNICAL FIELD

The present disclosure relates to a communication method, a node, and a user equipment used in a mobile communication system.

BACKGROUND OF INVENTION

The 3rd generation partnership project (3GPP (trade name), hereinafter the same), which is a standardization project for mobile communication systems, defines the technical specifications of Dual Connectivity (DC). In DC, a user equipment (UE) performs wireless communication with a master cell group (MCG) of a master node (MN) and a secondary cell group (SCG) of a secondary node (SN). In DC, the roles of the nodes communicating with the UE are divided into the MN and the SN. Except for configurations determined independently by the SN, the MN has the initiative (also referred to as "control authority") to configure and control the UE.

In each of MCG and SCG, a plurality of component carriers (CCs) corresponding to a plurality of serving cells is aggregated, enabling the UE to simultaneously perform reception or transmission over the plurality of CCs (i.e., a plurality of cells). The plurality of CCs may be contiguous or non-contiguous in the frequency domain. One serving cell in each of the MCG and SCG is referred to as a primary cell (PCell), and one or more secondary cells (SCells) are configured for the UE together with the PCell to form a set of serving cells. Note that the PCell is also referred to as an SpCell. The PCell (SpCell) of the SCG is also referred to as a primary secondary cell (PSCell).

In the current 3GPP technical specifications, only one SN is used by the UE in the DCs. On the other hand, Non-Patent Document 1 describes multi-connectivity in which a UE simultaneously uses a plurality of SNs (i.e., a plurality of SCGs). However, in such multi-connectivity, since the MN performs configuration and/or control related to a plurality of SNs, the load on the MN may increase.

CITATION LIST

Non-Patent Literature

[Non-Patent Document 1] 3GPP Contribution, RWS—210143 "Multi Radio Multi Connectivity for Rel-18"

SUMMARY

In a first aspect, a communication method for a user equipment to perform wireless communication with a master node and a plurality of secondary nodes in a mobile communication system includes performing, at the master node, processing of transferring, to at least one of the plurality of secondary nodes, a control authority for performing, on a user equipment, configuration and/or control related to a coordinated operation between the plurality of secondary nodes, and performing, at the secondary node to which the control authority is transferred, the configuration and/or control related to the coordinated operation on the user equipment.

In a second aspect, a node for operating as a master node in a mobile communication system in which a user equipment performs wireless communication with the master node and a plurality of secondary nodes includes a controller configured to perform processing of transferring, to at least one of a plurality of secondary nodes, a control authority for performing, on a user equipment, configuration and/or control related to a coordinated operation between the plurality of secondary nodes.

In a third aspect, a node for operating as a secondary node in a mobile communication system in which a user equipment performs wireless communication with a master node and a plurality of secondary nodes includes a controller configured to perform, on the user equipment, configuration and/or control related to a coordinated operation between the plurality of secondary nodes when a control authority for performing, on the user equipment, the configuration and/or control related to the coordinated operation is transferred from the master node to the node.

In a fourth aspect, a user equipment for performing wireless communication with a master node and a plurality of secondary nodes includes a wireless communicator configured to receive a signal for configuration and/or control related to a coordinated operation between the plurality of secondary nodes from a secondary node to which a control authority for performing, on the user equipment, the configuration and/or control related to the coordinated operation is transferred from the master node.

DESCRIPTION OF EMBODIMENTS

Figure 1:
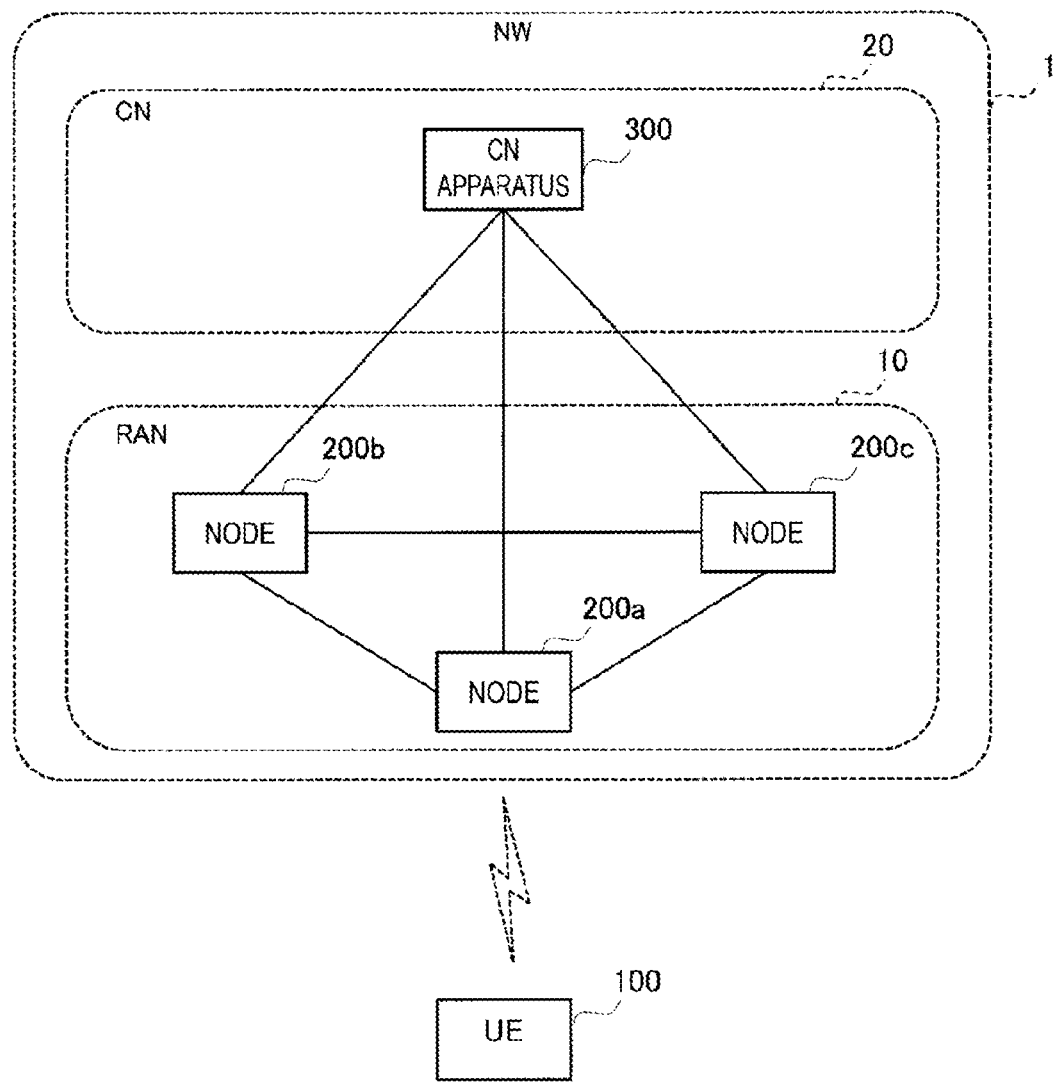
FIG. 1 is a diagram illustrating a configuration example of a mobile communication system according to an embodiment.

A mobile communication system according to embodiments will be described below with reference to the drawings. In the description of the drawings, the same or similar parts are denoted by the same or similar reference numerals.

(1) First Embodiment

A first embodiment will be described with reference to FIG. 1 to FIG. 11.

(1.1) Configuration Example of System

FIG. 1 is a diagram illustrating a configuration example of a mobile communication system according to the first embodiment. The mobile communication system according to the first embodiment is a system conforming to the 3GPP standard. For example, the mobile communication system according to the first embodiment may be a 5th Generation (5G) System or a 6th Generation (6G) System.

The mobile communication system includes a network (NW) 1 and a user equipment (UE) 100. The UE 100 is a mobile communication apparatus and performs wireless communication with the NW 1. The UE 100 may be an apparatus used by a user and may be, for example, a mobile phone terminal (including a smartphone), a tablet terminal, a laptop personal computer (PC), a communication module (including a communication card or chipset), a sensor or an apparatus provided in a sensor, a vehicle or an apparatus provided in a vehicle (Vehicle UE), an aircraft or an apparatus provided in an aircraft (Aerial UE).

The NW 1 includes a radio access network (RAN) 10 and a core network (CN) 20. When the mobile communication system is a 5th Generation System (5GS), the RAN 10 is called a Next Generation Radio Access Network (NG-RAN) and the CN 20 is called a 5G Core Network (5GC).

The RAN 10 includes a plurality of nodes 200 (nodes 200a to 200c in the illustrated example). The nodes 200 are connected to each other via inter-node interfaces. The nodes 200 are also called base stations. Each node 200 may include (i.e., be functionally divided into) a Central Unit (CU) and a Distributed Unit (DU), and the two units may be connected through a fronthaul interface. When the mobile communication system is a 5GS, the nodes 200 are called gNBs, the inter-node interfaces are called Xn interfaces, and the fronthaul interface is called an F1 interface.

Each node 200 manages one or more cells. The node 200 performs wireless communication with the UE 100 that has established connections to the cells of the node 200. Each node 200 has a radio resource management (RRM) function, a user data (also simply referred to as "data") routing function, a measurement control function for mobility control/scheduling, and the like. Note that a "cell" is used as a term indicating a minimum unit of a wireless communication area. The "cell" is also used as a term representing a function or a resource for performing wireless communication with the UE 100. One cell belongs to one carrier frequency (also simply referred to as one "frequency").

The CN 20 includes a CN apparatus 300. The CN apparatus 300 may include a control plane (C-plane) apparatus corresponding to a C-plane and a user plane (U-plane) apparatus corresponding to a U-plane. The C-plane apparatus performs various mobility control, paging, and the like for the UE 100. The C-plane apparatus communicates with the UE 100 using Non-Access Stratum (NAS) signaling. The U-plane apparatus performs data transfer control. When the mobile communication system is a 5GS, the C-plane apparatus is called an Access and Mobility Management Function (AMF), the U-plane apparatus is called a User Plane Function (UPF), and the interfaces between the node 200 and the CN apparatus 300 are called NG interfaces.

Figure 2:
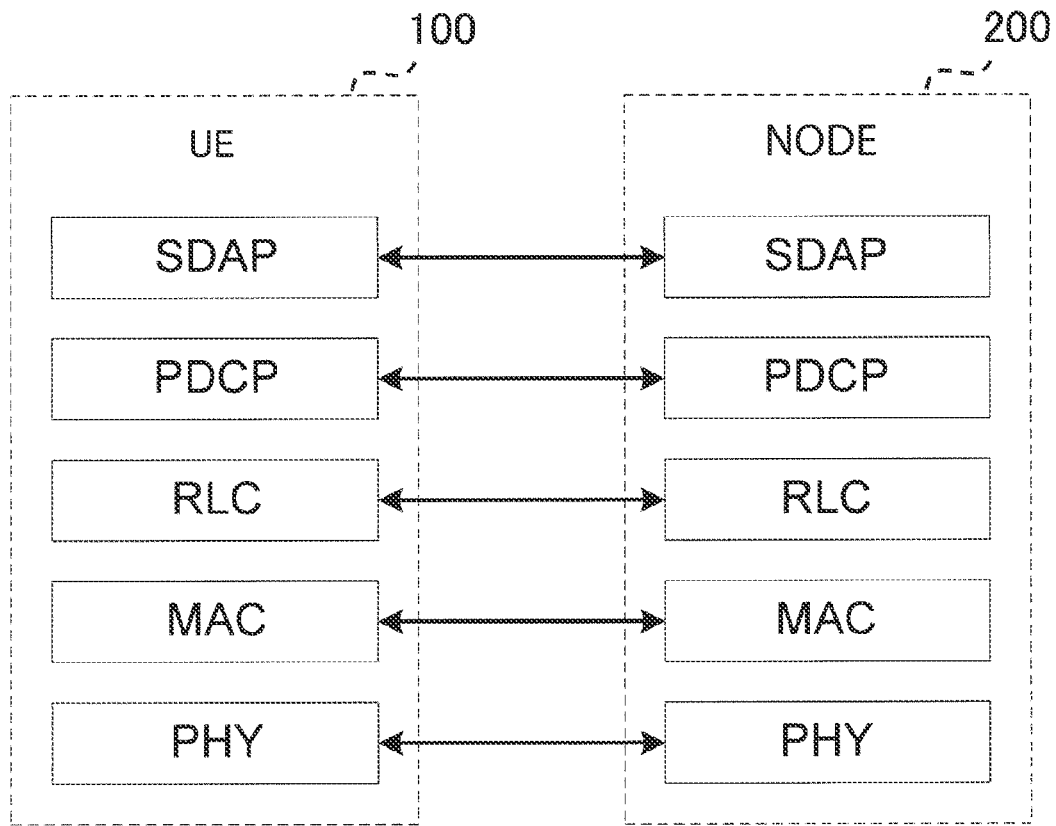
FIG. 2 is a diagram illustrating a configuration example of a radio interface protocol stack of a U-plane that handles data.

FIG. 2 is a diagram illustrating a configuration example of a radio interface protocol stack of the U-plane that handles data.

The U-plane radio interface protocols include, for example, a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information is transferred between the PHY layer of the UE 100 and the PHY layer of the node 200 via a physical channel. The PHY layer of the UE 100 receives downlink control information (DCI) transmitted from the node 200 over a physical downlink control channel (PDCCH). Specifically, the UE 100 blind decodes the PDCCH using a radio network temporary identifier (RNTI) and acquires successfully decoded DCI as DCI addressed to the UE 100. The DCI transmitted from the node 200 is appended with CRC parity bits scrambled by the RNTI.

The MAC layer performs data priority control, retransmission processing through hybrid ARQ (HARQ), and the like. Data and control information is transferred between the MAC layer of the UE 100 and the MAC layer of the node 200 via a transport channel. The MAC layer of the node 200 includes a scheduler. The scheduler determines uplink and downlink transport formats (transport block sizes and modulation and coding schemes (MCSs)) and resources allocated to the UE 100.

The RLC layer transfers data to the RLC layer on the reception side by using functions of the MAC layer and the PHY layer. Data and control information is transferred between the RLC layer of the UE 100 and the RLC layer of the node 200 via a logical channel.

The PDCP layer performs header compression/decompression, encryption/decryption, and the like.

The SDAP layer performs mapping between an IP flow which is the unit in which the CN 20 performs QoS control and a radio bearer which is the unit in which an Access Stratum (AS) performs QoS control. Note that, when the RAN is connected to the EPC, the SDAP need not be provided.

Figure 3:
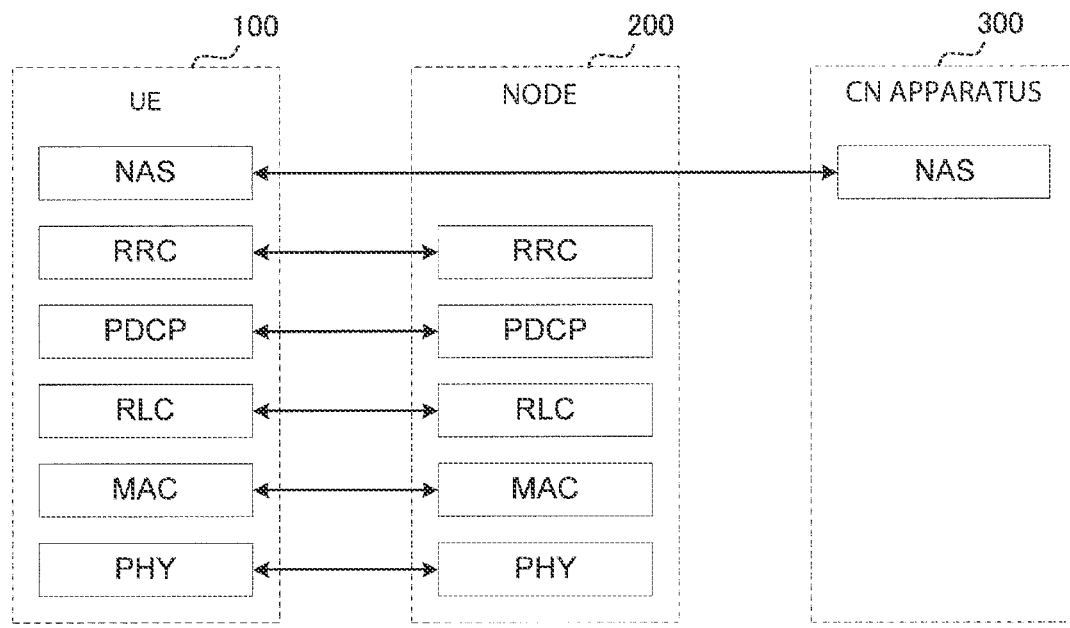
FIG. 3 is a diagram illustrating a configuration example of a radio interface protocol stack of a C-plane that handles signaling (control signals).

FIG. 3 is a diagram illustrating a configuration example of a radio interface protocol stack of the C-plane that handles signaling (control signals).

The radio interface protocol stack of the C-plane includes, for example, a Radio Resource Control (RRC) layer and a Non-Access Stratum (NAS) layer instead of the SDAP layer illustrated in FIG. 2.

RRC signaling for various configurations is transferred between the RRC layer of the UE 100 and the RRC layer of the node 200. The RRC layer controls a logical channel, a transport channel, and a physical channel according to establishment, re-establishment, and release of a radio bearer. When there is a connection between the RRC of the UE 100 and the RRC of the node 200 (RRC connection), the UE 100 is in an RRC connected state. When there is no connection between the RRC of the UE 100 and the RRC of the node 200 (RRC connection), the UE 100 is in an RRC idle state. When the connection between the RRC of the UE 100 and the RRC of the node 200 is suspended, the UE 100 is in an RRC inactive state.

The NAS layer (also simply referred to as a "NAS") located above the RRC layer performs session management, mobility management, and the like. NAS signaling is transferred between the NAS layer of the UE 100 and the NAS layer of the CN apparatus 300. Note that the UE 100 includes an application layer other than the protocol of the radio interface. Each layer lower than the NAS layer is referred to as an AS layer (also simply referred to as an "AS").

(1.2) DC Using Terahertz Wave Cells

Figure 4:
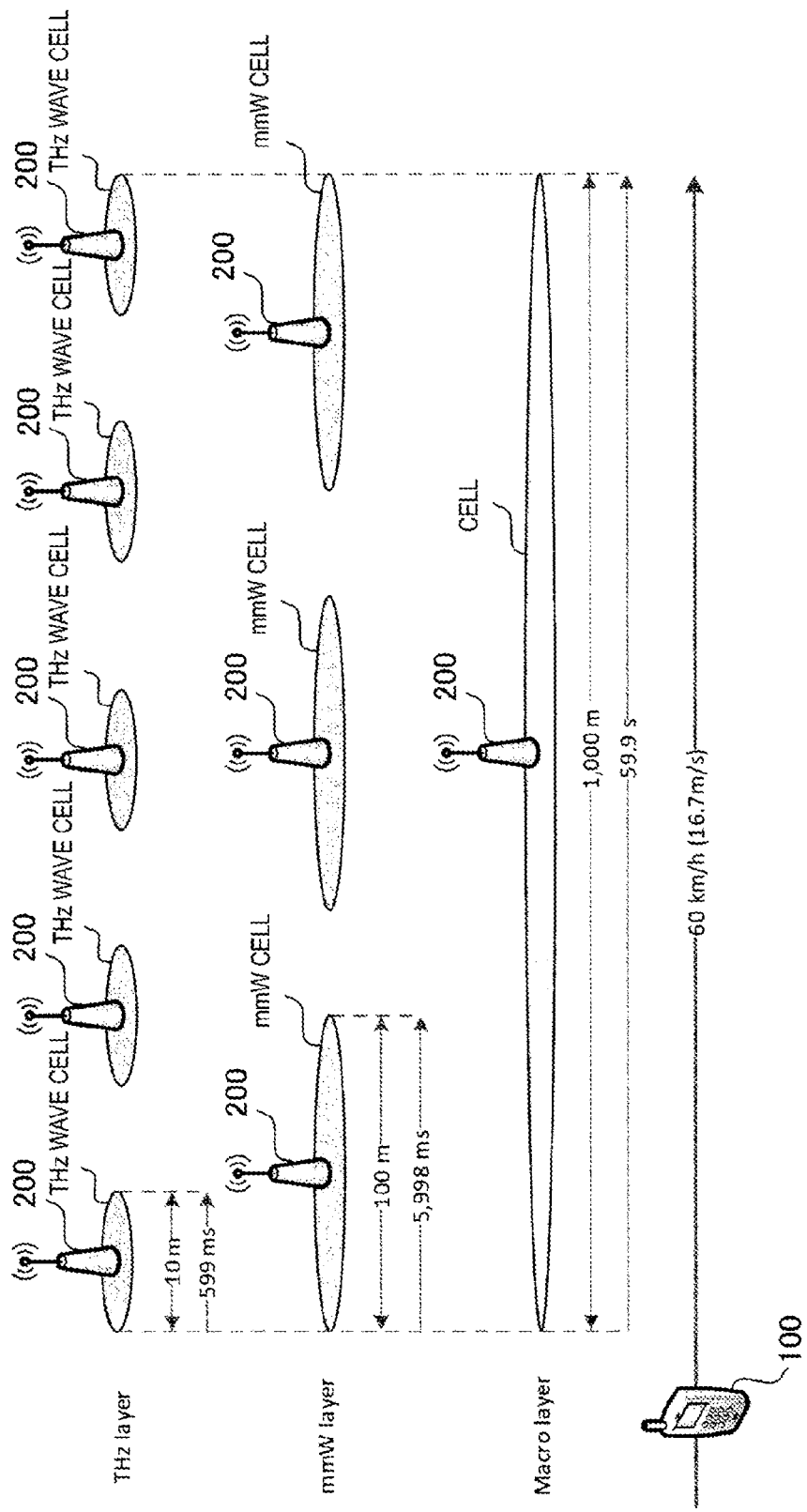
FIG. 4 is a diagram illustrating terahertz (THz) wave cells according to an embodiment.

FIG. 4 is a diagram for illustrating terahertz (THz) wave cells according to the first embodiment.

The mobile communication system according to the first embodiment may be a 6G system. 6G is expected to utilize terahertz (THz) waves. A cell that operates with THz waves is called a THz wave cell. Compared to millimeter waves (mmW), THz waves have higher propagation, higher free space loss, and are more susceptible to the effects of the atmosphere and rainfall. Thus, THz wave cells can be ultra-compact size cells.

In the illustrated example, the diameter of the coverage area of a THz wave cell is about 10 m, the diameter of the coverage area of a mmW cell that operates with mmW is about 100 m, and the diameter of the coverage area of a macro cell is about 1000 m. Under this assumption, the UE 100 which is moving at, for example, 60 km/s passes through the coverage area of each THz wave cell in about 599 ms.

Dual Connectivity (DC) is one method for reliably controlling compact size cells in a mobile communication system.

Figure 5:
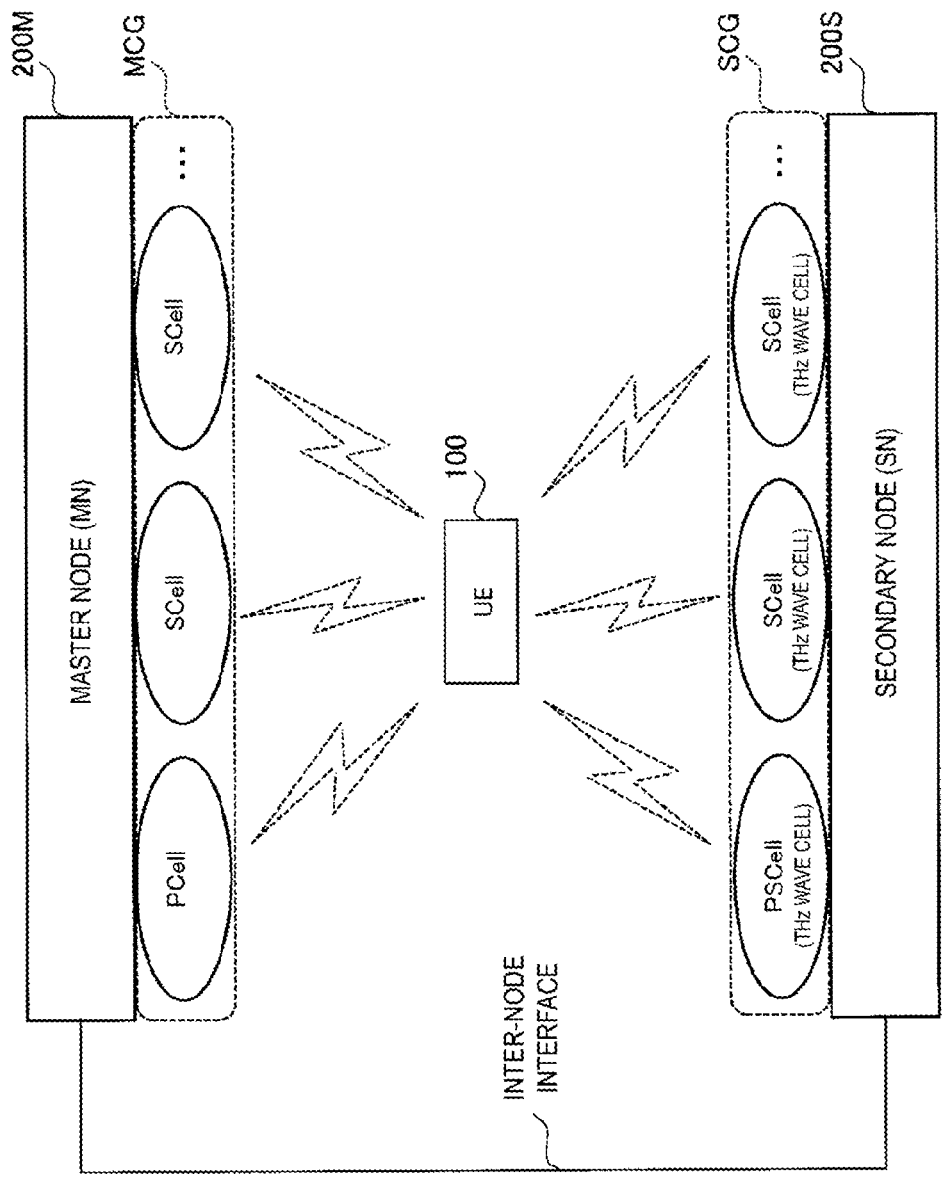
FIG. 5 is a diagram illustrating dual connectivity (DC) according to an embodiment.

FIG. 5 is a diagram for illustrating dual connectivity (DC) according to the first embodiment. The first embodiment assumes that a THz wave cell is used as a cell of a secondary cell group (SCG). The THz wave cell may be used as a secondary cell (SCell) of a master cell group (MCG). However, an mmW cell may be used instead of the THz wave cell.

DC can be configured for the UE 100 in an RRC connected state. In DC, the UE 100 performs wireless communication with the master cell group (MCG) managed by a master node (MN) 200M and the secondary cell group (SCG) managed by a secondary node (SN). The MN 200M and the SN 200S are connected to each other via an inter-node interface. The MN 200M and the SN 200S are hereinafter simply referred to as the node 200 when MN 200M and the SN 200S are not distinguished from each other. The MN 200M is also referred to as master gNB (MgNB) when the MN 200M is a node of 5G/NR. The SN 200M is also referred to as secondary gNB (sgNB) when the SN 200M is a node of 5G/NR. The MN 200M has the initiative (control authority) to perform configuration and control on the UE 100 except for configurations that are independently determined by the SN 200S.

For example, when the MN 200M transmits a predetermined message (for example, an SN Addition Request message) to the SN 200S and the MN 200M transmits an RRC Reconfiguration message to the UE 100, this causes the SCG to be configured for the UE 100 and the DC to be started. In the DC, the UE 100 in the RRC connected state is allocated radio resources from schedulers of the MN 200M and the SN 200S, and performs wireless communication using the radio resources of the MN 200M and the radio resources of the SN 200S.

The MN 200M may have a control plane connection with the CN20. The MN 200M provides main radio resources for the UE 100. The MN 200M manages the MCG that is a group of serving cells associated with the MN 200M. The MCG includes a primary cell (PCell) and optionally one or more secondary cells (SCells). On the other hand, the SN 200S need not have control plane connection with the CN20. The SN 200S provides additional radio resources to the UE 100. The SN 200S manages the SCG that is a group of serving cells associated with the SN 200S. The SCG includes a primary secondary cell (PSCell) and optionally one or more SCells. Note that the PCell of the MCG and the PSCell of the SCG may be referred to as a special cell (SpCell).

According to current 3GPP technical specifications, in DC, the UE 100 utilizes only one SN 200S. In other words, the UE 100 cannot use a plurality of SNs 200S at the same time. On the other hand, the first embodiment assumes multi-connectivity in which UE 100 simultaneously uses a plurality of SNs 200S (i.e., a plurality of SCGs).

(1.3) Overview of LTM

The mobile communication system according to the first embodiment supports L1/L2 triggered mobility (LTM).

LTM is a technique for triggering cell switching by signaling of lower layers, layer 1 (L1) and/or layer 2 (L2), thus reducing delay of mobility compared to a general handover procedure. In LTM, first, the node 200 prepares LTM candidate cell configurations for a candidate cell for a switching destination and provides the LTM candidate cell configuration to the UE 100 via RRC signaling. Second, the node 200 receives a layer 1 (L1) measurement report from the UE 100 and transmits a cell switch command indicating LTM candidate cell configurations to the UE 100 via a MAC CE (Control Element), based on the L1 measurement report. A trigger for the cell switching is carried in a MAC CE including at least candidate configuration indexes together with a beam indicator. Third, the UE 100 changes the serving cell according to the cell switch command. Thus, cell switching is triggered by the node 200 selecting an LTM candidate cell configuration as the target configuration. The LTM candidate cell configurations can be added, modified, and released by the node 200 via RRC signaling. The following principles apply to the LTM.

- Each LTM candidate cell configuration can be provided as a difference configuration (delta configuration) relative to the reference configuration used to form a complete candidate cell configuration.
- Application of the complete candidate cell configuration replaces the current UE configuration when the cell is switched. A reconfiguration procedure includes replacement but does not necessarily involve resetting of the MAC, RLC or PDCP layer.
- The user plane is continued without resetting when the user plane is configured by RRC signaling in order to avoid additional delay of data recovery.

In the LTM, security is not updated.
The LTM between subsequent LTM candidate cell configurations can be performed without RRC reconfiguration. In other words, after the LTM is triggered, the UE 100 does not release any other LTM candidate cell configuration.

The first embodiment assumes a scenario in which the LTM is used to change the PSCell of the UE 100 between the SNs 200S. Such a scenario will be described in detail below.

Figure 6:
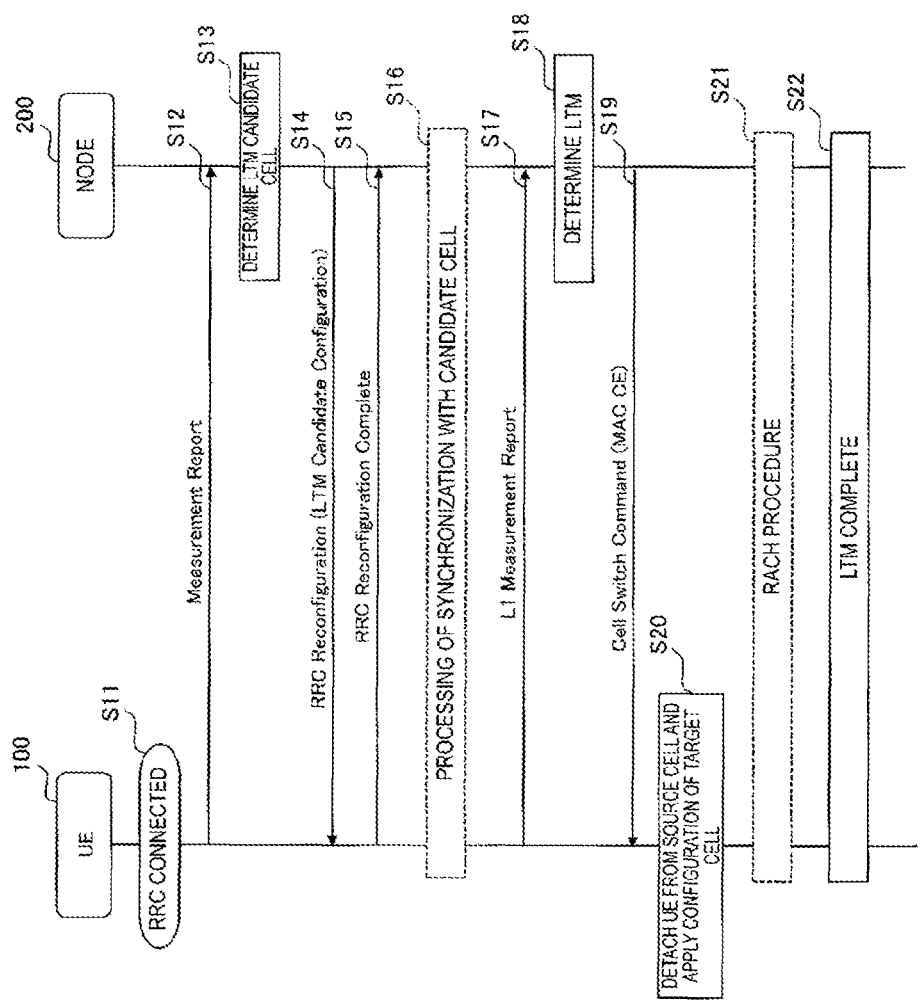
FIG. 6 is a diagram illustrating an example of an LTM procedure according to an embodiment.

FIG. 6 is a diagram illustrating an example of an LTM procedure according to the first embodiment. The illustrated example assumes that the UE 100 performs cell switching from the first cell of the node 200 to the second cell of the node 200. Here, the first cell and the second cell may include mutually different transmission and reception points (TRPs).

In step S11, the UE 100 is in the RRC connected state in a cell of the node 200.

In step S12, the UE 100 transmits a Measurement Report message being an RRC message to the node 200.

In step S13, the node 200 determines to use LTM, based on the Measurement Report message and starts preparing candidate cells.

In step S14, the node 200 transmits, to the UE 100, an RRC Reconfiguration message including LTM candidate cell configurations (LTM Candidate Configurations) of one or more candidate cells.

In step S15, the UE 100 stores LTM candidate cell configurations and transmits an RRC Reconfiguration Complete message to the node 200.

In step S16, the UE 100 may perform downlink (DL) synchronization and timing advance (TA) acquisition with the candidate cell before receiving the cell switch command.

In step S17, the UE 100 performs layer 1 (L1) measurement in the configured candidate cell and transmits a lower layer measurement report (L1 Measurement Report) to the node 200. The L1 Measurement Report may be transmitted and received in the L1, which is the PHY layer. The L1 Measurement Report may be transmitted and received in the layer 2 (L2) including the MAC-layer, the RLC-layer, and the PDCP-layer. Note that the order of step S16 and step S17 may be inverted.

In step S18, the node 200 determines to perform cell switching to the target cell (second cell).

In step S19, the node 200 transmits, to the UE 100, a Cell Switch Command (MAC CE) including the candidate configuration index of the target cell.

In step S20, the UE 100 switches to the target cell configuration. To be specific, the UE 100 detaches from the source cell (first cell) and applies the configuration of the target cell.

In step S21, when the cell switching needs to include performing a random access procedure, the UE 100 performs the random access procedure on the target cell. When the UE need not acquire the TA of the target cell at the time of cell switching, the UE 100 may skip the random access procedure.

In step S22, the UE 100 indicates that cell switching to the target cell is successfully completed. The UE 100 may then perform steps S16 through S22 multiple times for subsequent LTM cell switching, based on the configuration provided in step S14.

(1.4) Configuration Example of Node

Figure 7:
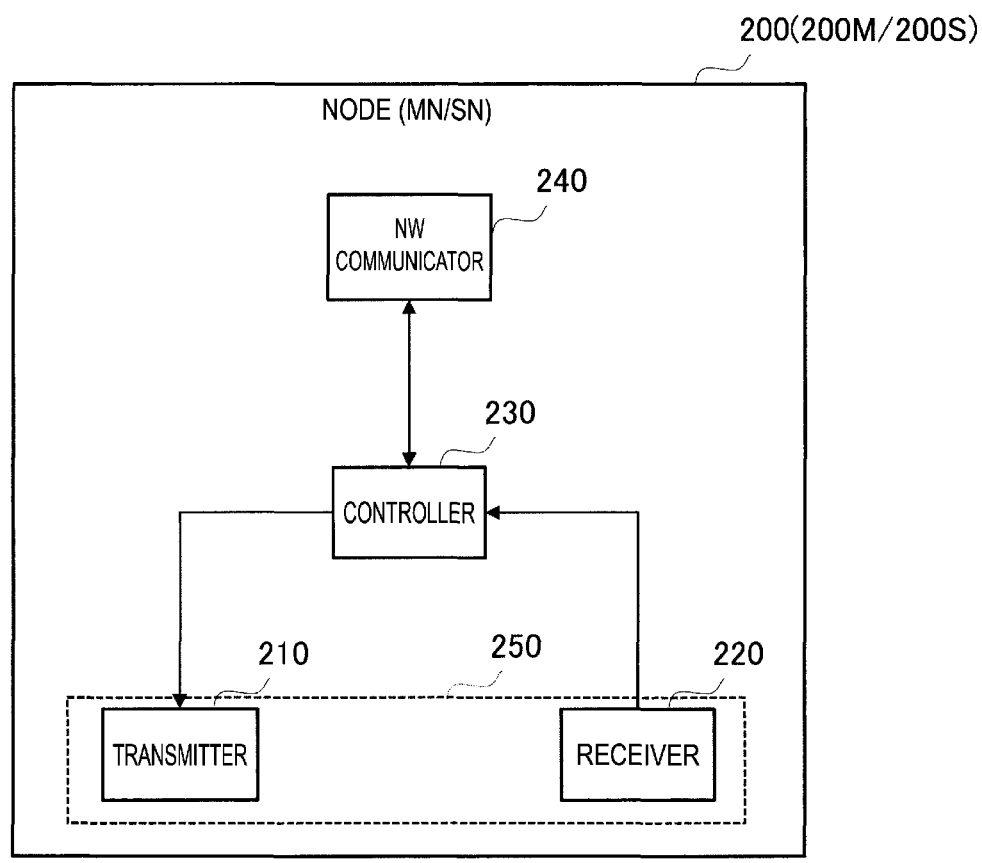
FIG. 7 is a diagram illustrating a configuration example of a node (base station) according to an embodiment.

FIG. 7 is a diagram illustrating a configuration example of the node 200 (base station) according to the first embodiment. The node 200 may be the MN 200M or the SN 200S.

The node 200 includes a transmitter 210, a receiver 220, the controller 230, and a NW communicator 240. The transmitter 210 and the receiver 220 constitute a wireless communicator 250 that performs wireless communication with the UE 100.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna. The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processes in the node 200. The operations of the node 200 described above and below may also be performed under the control of the controller 230. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The NW communicator 240 is connected to adjacent nodes via inter-node interfaces. The NW communicator 240 is connected to the CN apparatus 300 via a node-CN interface.

The node 200 configured as described above may operate as the MN 200M when the UE 100 performs wireless communication with the MN 200M and the plurality of SNs 200S (i.e., multi-connectivity). In the first embodiment, the controller 230 of the node 200 operating as the MN 200M performs control in such a manner that a control authority for performing, on the UE 100, configuration and/or control related to a coordinated operation between the plurality of SNs 200S is transferred to at least one of the plurality of SNs 200S.

The node 200 may operate as the SN 200S when the UE 100 performs wireless communication with the MN 200M and the plurality of SNs 200S (i.e., multi-connectivity). In the first embodiment, the controller 230 of the node 200 operating as the SN 200S performs, on the UE 100, the configuration and/or control related to the coordinated operation between the plurality of SNs 200S, when the control authority to perform the configuration and/or control for the coordinated operation is transferred from the MN 200M to the node 200.

(1.5) Configuration Example of User Equipment

Figure 8:
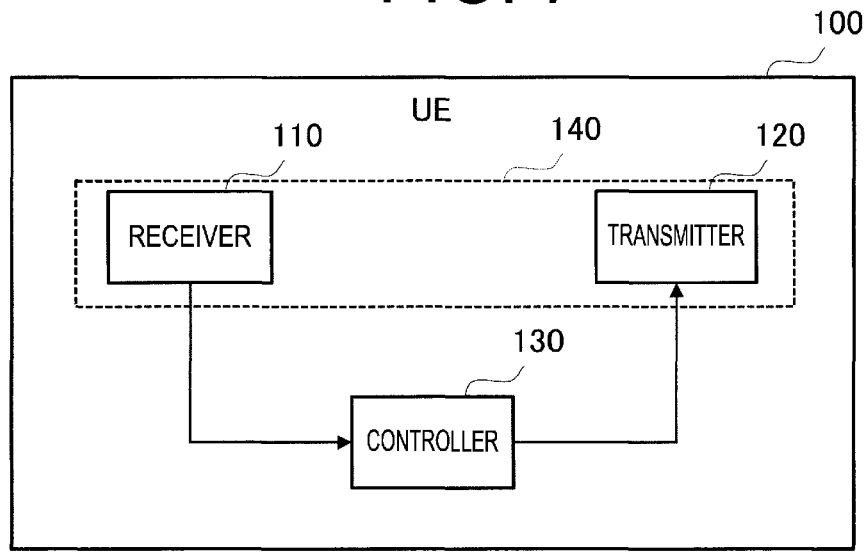
FIG. 8 is a diagram illustrating a configuration example of a user equipment (UE) according to an embodiment.

FIG. 8 is a diagram illustrating a configuration example of the UE 100 (user equipment) according to the first embodiment.

The UE 100 includes a receiver 110, a transmitter 120, and a controller 130. The receiver 110 and the transmitter 120 constitute a wireless communicator 140 that performs wireless communication with the node 200.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130. The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. The operations of the UE 100 described above and below may also be performed under the control of a controller 230. The controller 130 includes at least one processor and at least one memory.

The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

The UE 100 configured as described above may perform wireless communication (i.e., multi-connectivity) with the MN 200M and the plurality of SNs 200S. The wireless communicator 140 (receiver 110) of the UE 100 receives a radio signal for the configuration and/or control related to the coordinated operation between the plurality of SNs 200S, from the SN 200S to which the control authority for performing the configuration and/or control for the coordinated operation is transferred from the MN 200M.

(1.6) Operation Example of System

Figure 9:
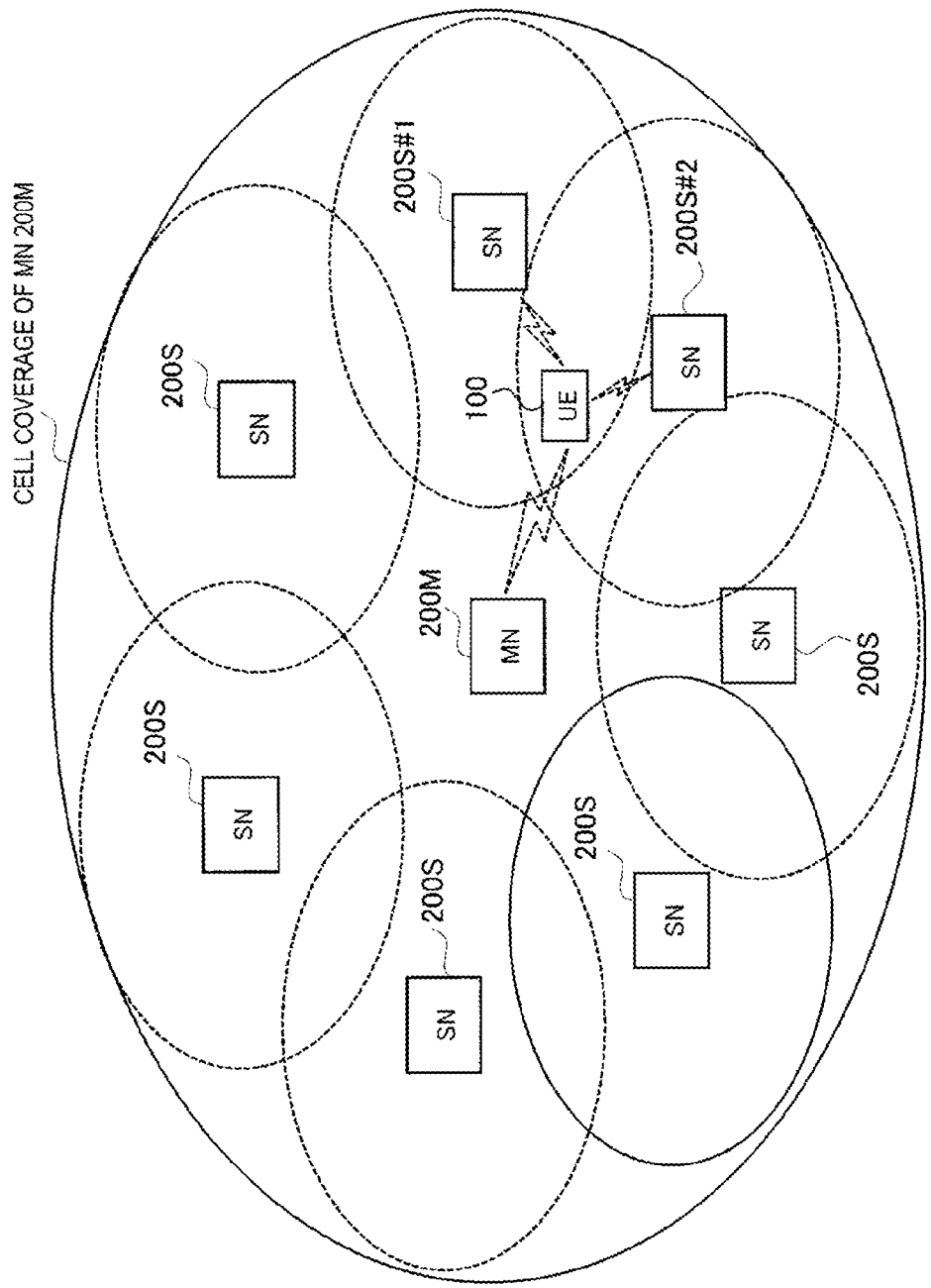
FIG. 9 is a diagram illustrating an operation scenario for the mobile communication system according to a first embodiment.

FIG. 9 is a diagram for illustrating an operation scenario of the mobile communication system according to the first embodiment.

In the illustrated example, the UE 100 performs multi-connectivity-based wireless communication with the MN 200M and a plurality of SNs 200S (SN 200S #1 and SN 200S #2). Each SN 200S has a narrower cell coverage than the MN 200M. To be more specific, each SN 200S (SCG) is operated at a higher frequency than the MN 200M (MCG). For example, the MN 200M (MCG) may be operated in the Sub-6 band, and each SN 200S (SCG) may be operated in the THz band or the mmW band. The first embodiment mainly assumes a scenario in which each SN 200S (SCG) is operated in the THz band.

In this way, in a scenario in which the cell coverage of each SN 200S (SCG) is narrow, multi-connectivity is preferably achieved by configuring a plurality of SCGs for the UE 100, with switching performed between the SCGs due to movement of the UE 100. However, in such multi-connectivity, the MN 200 needs to perform configuration and/or control for a plurality of SNs 200S, and the load on the MN 200M may increase. In other words, in multi-connectivity, when the MN 200M manages all control operations as in DC, the load on the MN 200M increases significantly, and this is not preferable. In the first embodiment, the authority is transferred from the MN 200M to the SN 200S to reduce the load on MN 200M.

Figure 10:
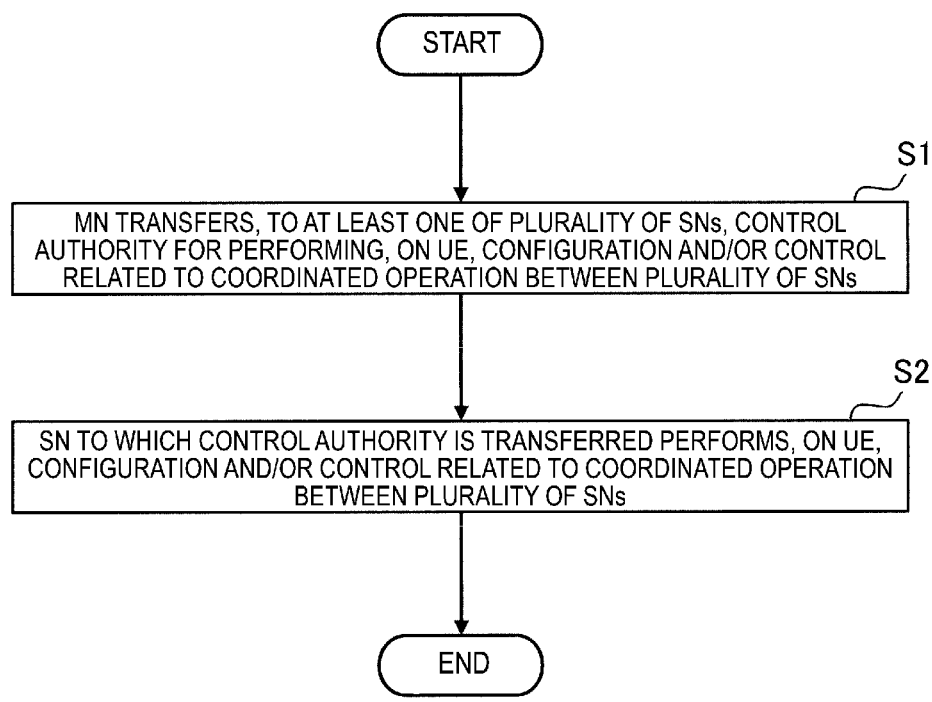
FIG. 10 is a diagram illustrating an overview of operations of the mobile communication system according to the first embodiment.

FIG. 10 is a diagram providing an overview of operations of the mobile communication system according to the first embodiment.

In step S1, the MN 200M transfers, to at least one SN 200S of the plurality of SNs 200S, the control authority for performing, for the UE 100, the configuration and/or control related to the coordinated operation between the plurality of SNs 200S. For example, the MN 200M transmits, to at least one of the plurality of SNs 200S, a first message for requesting the coordinated operation between the plurality of SNs 200S.

In step S2, the SN 200S to which the control authority has been transferred performs, on the UE 100, the configuration and/or control related to the coordinated operation between the plurality of SNs 200S. Upon receiving the first message from the MN 200M, the SN 200S may transmit a second message for starting the coordinated operation between the plurality of SNs 200S, to another SN 200S included in the plurality of SNs 200S.

Thus, even when the multi-connectivity is achieved, an increase in the load on the MN 200M can be suppressed.

In the first embodiment, the coordinated operation between the plurality of SNs 200S is a cell switching operation for switching the serving cell of the UE 100 between the SN 200S. In other words, the MN 200M transfers the authority in such a manner that the mobility of the UE 100 is controlled between the SNs 200S.

The first embodiment assumes a scenario in which the above-described cell switching operation (mobility control) based on the LTM is performed. To be more specific, in the first embodiment, the UE 100 is configured with the cells (TRPs) of the plurality of SNs 200S, and the LTM is used to change the PSCell of the UE 100 between the SNs 200S. In such a scenario, each SN 200S may not know with which SN 200S the coordinated operation (TRP coordinated operation) is to be performed. However, in the first embodiment, the combination of the SNs 200S to perform the coordinated operation can be identified by the first message and/or the second message described above.

Figure 11:
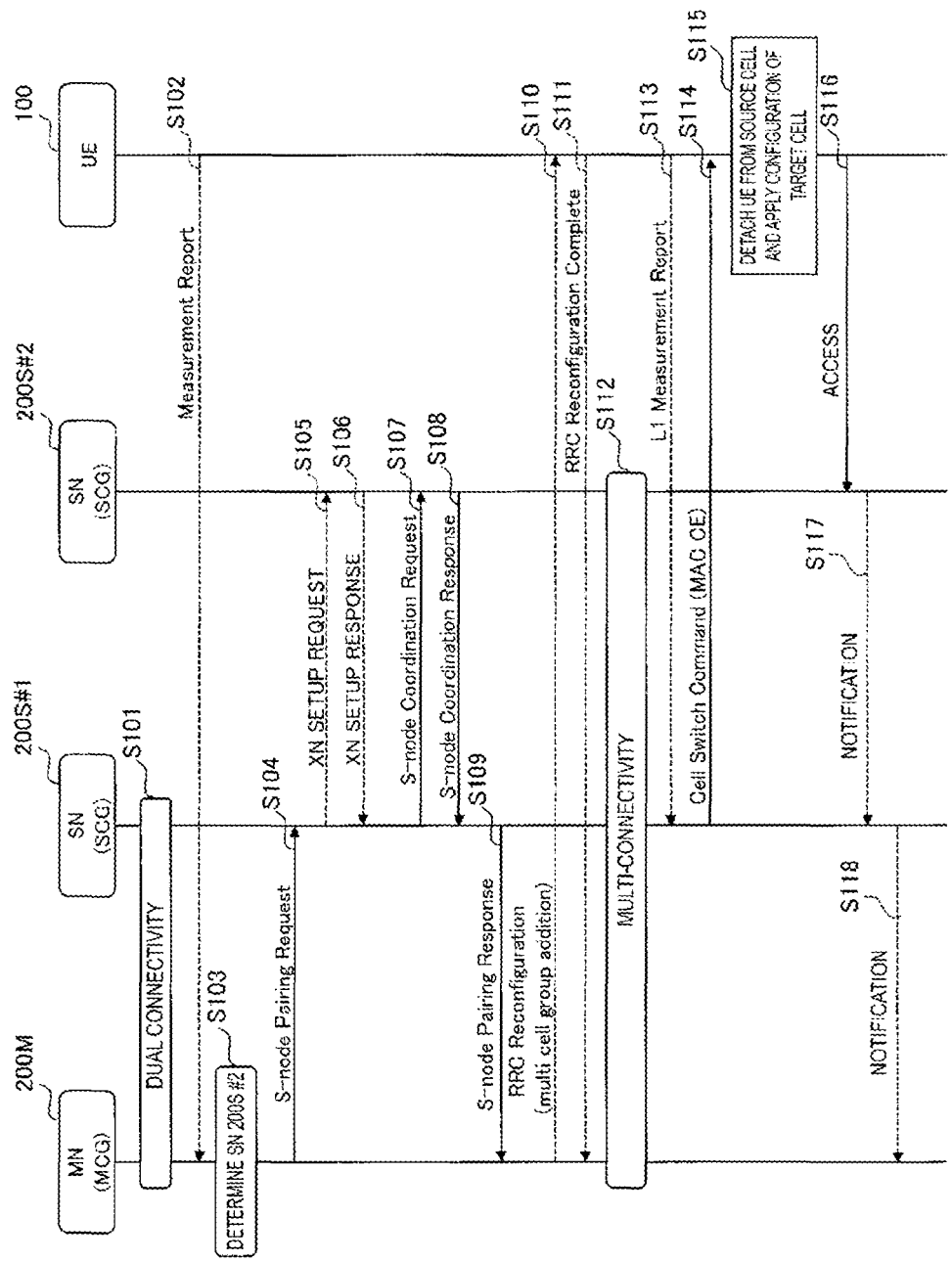
FIG. 11 is a diagram illustrating an example of operations of the mobile communication system according to the first embodiment.

FIG. 11 is a diagram illustrating an example of operations of the mobile communication system according to the first embodiment. In FIG. 11, dashed lines indicate non-essential steps.

In step S101, the UE 100 performs dual-connectivity (DC) wireless communication with the MN 200M and the SN 200S #1.

In step S102, the UE 100 may transmit, to the MN 200M, a Measurement Report message including radio quality measurement results for the respective cells. The MN 200M may receive the Measurement Report message from the UE 100.

In step S103, the MN 200M determines the combination of the SNs 200S to be operated in coordination. For example, based on the Measurement Report message in step S102, the MN 200M identifies a cell having radio quality satisfying a predetermined condition, and determines the SN 200S to which the identified cell belongs. Here, the MN 200M is assumed to have determined the SN 200S #2 as the SN 200S to be operated in coordination with the SN 200S #1. The MN 200M may determine the SN 200S #2 as SN 202S to be operated in coordination with the SN 200S #1, based on the combination of the SNs 200S (or a combination of cells) configured by the network operator (Operation Administration and Management (OAM)). In the first embodiment, the MN 200M may determine the cell of the SN 200S #1 as a source cell for the LTM and may determine the cell of SN 200S #2 to be a candidate cell (or target cell) for the LTM.

In step S104, the MN 200M transmits, to the SN 200S #1, an S-node Pairing Request message that is a request message (first message) for the coordinated operation. In the illustrated example, the MN 200M transmits the S-node Pairing Request message to the SN 200S #1. However, the MN 200M may transmit the S-node Pairing Request message to the SN 200S #2, or may transmit the S-node Pairing Request message to both the SN 200S #1 and the SN 200S #2. In the first embodiment, the S-node Pairing Request message may be a request message for requesting to change the PSCell of the UE 100 between the SNs 200S using the LTM.

Note that, in the illustrated example, the coordinated operation request message (first message) is a new message transmitted and received on the inter-node interface but that the coordinated operation request message (first message) may be an existing message (for example, S-NODE MODIFICATION REQUEST message) defined in the 3GPP technical specifications. The coordinated operation request message (first message) may be a request message (for example, an S-node Xn Establishment Request message) for requesting establishment of an inter-node interface between the SNs 200S.

The coordinated operation request message (first message) includes at least one piece of information among the following 1) to 5).

1) Identifier of the UE 100 of Interest:

The coordinated operation request message (first message) may include, for example, the identifier (such as Xn-AP UE ID) of the UE 100 on the inter-node interface.

2) Identifier of the SN 200S of Interest:

The coordinated operation request message (first message) may include, for example, the node ID of a target SN 200S, in particular, the ID of an SN 200S as a combination partner.

3) Identifier of the Cell of Interest (e.g., the Source Cell or the Candidate Cell):

The coordinated operation request message (first message) includes, for example, an NR Cell Global Identifier (NCGI) of a target cell, in particular, the cell ID of a combination partner.

4) Information Indicating the Type of a Target Coordinated Operation:

The coordinated operation request message (first message) includes, for example, information indicating a target type of coordinated operation (in the first embodiment, change of the PSCell between the SNs 200S using the LTM).

5) Full UE Context for the UE 100:

The coordinated operation request message (first message) may not include a partial UE context such as that transmitted by the existing S-NODE ADDITION REQUEST but may include a full UE context such as that transmitted by the existing Handover Request message.

As described above, the coordinated operation request message (first message) includes at least one selected from the group consisting of a UE identifier for identifying the UE 100, a node identifier for identifying the SN 200S which is the partner of the coordinated operation, a cell identifier for identifying the cell of the SN 200S which is the partner of the coordinated operation, a type identifier indicating the type of the coordinated operation, and a UE context of the UE 100.

In step S105, when the SN 200S #1 that has received the request message from the MN 200M includes no inter-node interface with the SN 200S #2 specified in the request message, the SN 200S #1 transmits, to the SN 200S #2, a message (for example, an XN SETUP REQUEST message) requesting establishment of the inter-node interface. When the inter-node interface with the SN 200S #2 specified in the request message is established, the SN 200S #1 need not transmit, to the SN 200S #2, the message (for example, the XN SETUP REQUEST message) for requesting establishment of the inter-node interface.

In step S106, upon receiving the message from the SN 200S #1 in step S105, the SN 200S #2 transmits, to the SN 200S #1, a response message (for example, an XN SETUP RESPONSE message) to the message. As a result, the inter-node interface is established between the SN 200S #1 and the SN 200S #2.

In step S107, upon receiving the request message from the MN 200M, the SN 200S #1 transmits a request message (for example, an S-node Coordination Request message) for starting the designated coordinated operation, to the SN 200S #2 designated in the request message. The request message includes at least one piece of information among 1) to 5) described above similarly to the message in step S104.

In step S108, upon receiving the request from the SN 200S #1 in step S107, the SN 200S #2 accepts the request and performs various configurations, and then transmits a response message (for example, an S-node Coordination Response message) to the SN 200S #1. The response message may include an RRC configuration related to SN 200S #2. The RRC configuration includes at least one of the following a) or b).

a) Configuration Information Related to a Cell (Candidate Cell) Managed by the SN 200S #2:

The configuration information may include configuration information of the cell, for example, a cell ID and a physical layer configuration, or may include configuration information for TRPs managed by the cell.

b) Configuration of the L1 Measurement Report.

In step S109, the SN 200S #1 transmits, to the MN 200M, a response message (for example, an S-node Pairing Response message) to the request message in step S104. The response message may include the RRC configuration of the SN 200S #2 (acquired in step S108 and which may include the configuration of the L1 Measurement Report configuration), and/or the RRC configuration of the SN 200S #1.

In step S110, the MN 200M may transmit an RRC Reconfiguration message to the UE 100. Instead of the MN 200M, the SN 200S #1 may transmit the RRC Reconfiguration message to the UE 100. The RRC Reconfiguration message may include configuration information related to the SN 200S #1 (for example, the RRC configuration) and/or configuration information related to the SN 200S #2 (for example, the RRC configuration and/or the configuration of the L1 Measurement Report). In the first embodiment, the RRC Reconfiguration message may include an LTM candidate cell configuration (LTM Candidate Configuration) in which the cell of SN 200S #2 is set as a candidate cell.

In step S111, the UE 100 may store the configuration information in the RRC Reconfiguration message, and transmit an RRC Reconfiguration Complete message to the MN 200M (or SN 200S #1).

In step S112, the UE 100 is configured with the SN 200S #1 and the SN 200S #2, leading to a multi-connectivity state. Here, the SN 200S #1 and the SN 200S #2 control the UE 100 in coordination.

In step S113, the UE 100 may transmit the L1 Measurement Report to the SN 200S #1. The SN 200S #1 may determine the cell switching to the cell of the SN 200S #2, based on the L1 Measurement Report.

In step S114, the SN 200S #1 transmits, to the UE 100, a Cell Switch Command (MAC CE) including information indicating the cell of the SN 200S #2.

In step S115, in response to the Cell Switch Command (MAC CE), the UE 100 applies the configuration of the cell (target cell) of the SN 200S #2 and is detached from the cell (source cell) of the SN 200S #1.

In step S116, UE 100 accesses the cell (target cell) of SN 200S #2.

In step S117, when the SN 200S #2 detects the access of the UE 100 (connection completion), the SN 200S #2 may notify the SL #1 of UE access completion. The notification may include the UE context for the UE 100. The notification may include the latest RRC configuration (the content of RRC Reconfiguration).

In step S118, the SN 200S #1 may notify the MN 200M of completion of change of the PSCell (PCell) for the UE 100. The notification may include the UE context for the UE 100. The notification may include the latest RRC configuration (the content of RRC Reconfiguration). The notification may include information such as the node ID of SN 200S #2.

(1.7) Variations of First Embodiment

In the above-described first embodiment, an example has been described in which the MN 200N determines (specifies) a combination of SNs 200S to be operated in coordination. However, the SN 200S may determine the combination of the SNs 200S to be operated in coordination.

Figure 12:
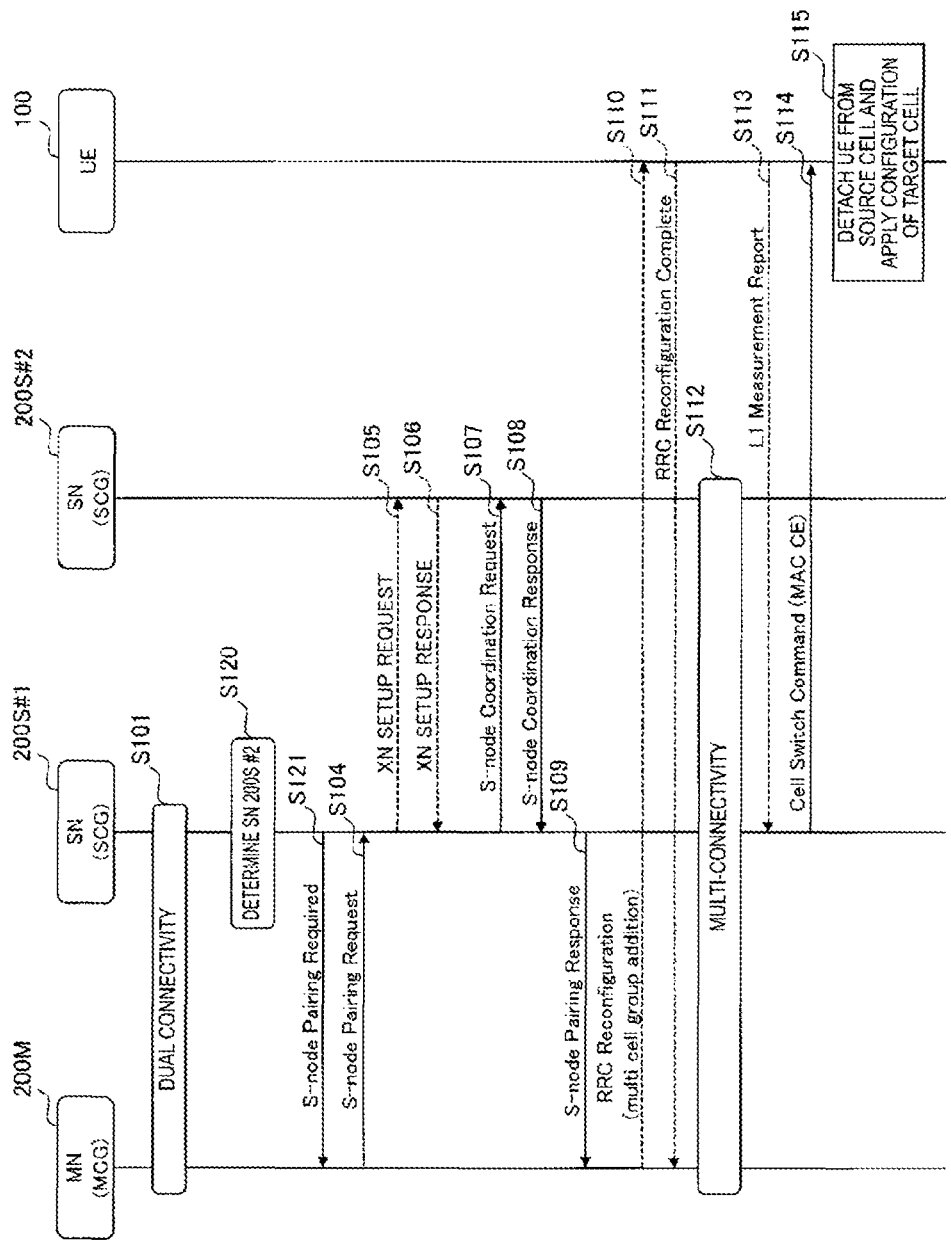
FIG. 12 is a diagram illustrating a variation of operations of the mobile communication system according to the first embodiment.

FIG. 12 is a diagram illustrating variation of operations of the mobile communication system according to the first embodiment. In FIG. 12, dashed lines indicate non-essential steps.

In the present variation, in step S120, the SN 200S #1 determines a combination of SNs 200S to be operated in coordination. The SN 200S #1 may determine the SN 200S #2 as the SN 200S to be operated in coordination with the SN 200S #1, based on the combination of the SNs 200S (or a combination of cells) configured by the network operator (OAM).

In step S121, the SN 200S #1 transmits, to the MN 200M, a message (for example, an S-node Pairing Required message) indicating a request for a coordinated operation with the SN 200S #2. The message includes at least one piece of information out of the following 1) to 5).

In step S104, the MN 200M transmits, to the SN 200S #1, an S-node Pairing Request message, which is a request message (first message) for a coordinated operation. The message is similar to that in the embodiment described above. In step S104, the MN 200M may transmit, to the SN 200S #1, a response message indicating that the request in step S121 is allowed. Subsequent operations are similar to the corresponding operations in the embodiment described above.

(2) Second Embodiment

A second embodiment will be described with reference to FIG. 13 and FIG. 14, focusing on differences from the first embodiment described above.

In the above-described first embodiment, an example has been described in which the coordinated operation between a plurality of SNs 200S is the cell switching operation of switching the serving cell of the UE 100 between the SNs 200S. In contrast, in the second embodiment, the coordinated operation between the plurality of SNs 200S is an operation in which instead of the MN 200M, a certain SN 200S (first secondary node) performs, for the UE 100, configuration and/or control of communication between another SN 200S (second secondary node) and the UE 100. In other words, in the second embodiment, the SN 200S functions as a proxy node (also referred to as a "proxy MN") of the MN 200M in order to perform configuration and/or control related to another SN 200S. Thus, even when the multi-connectivity is achieved, an increase in the load on the MN 200M can be suppressed.

Figure 13:
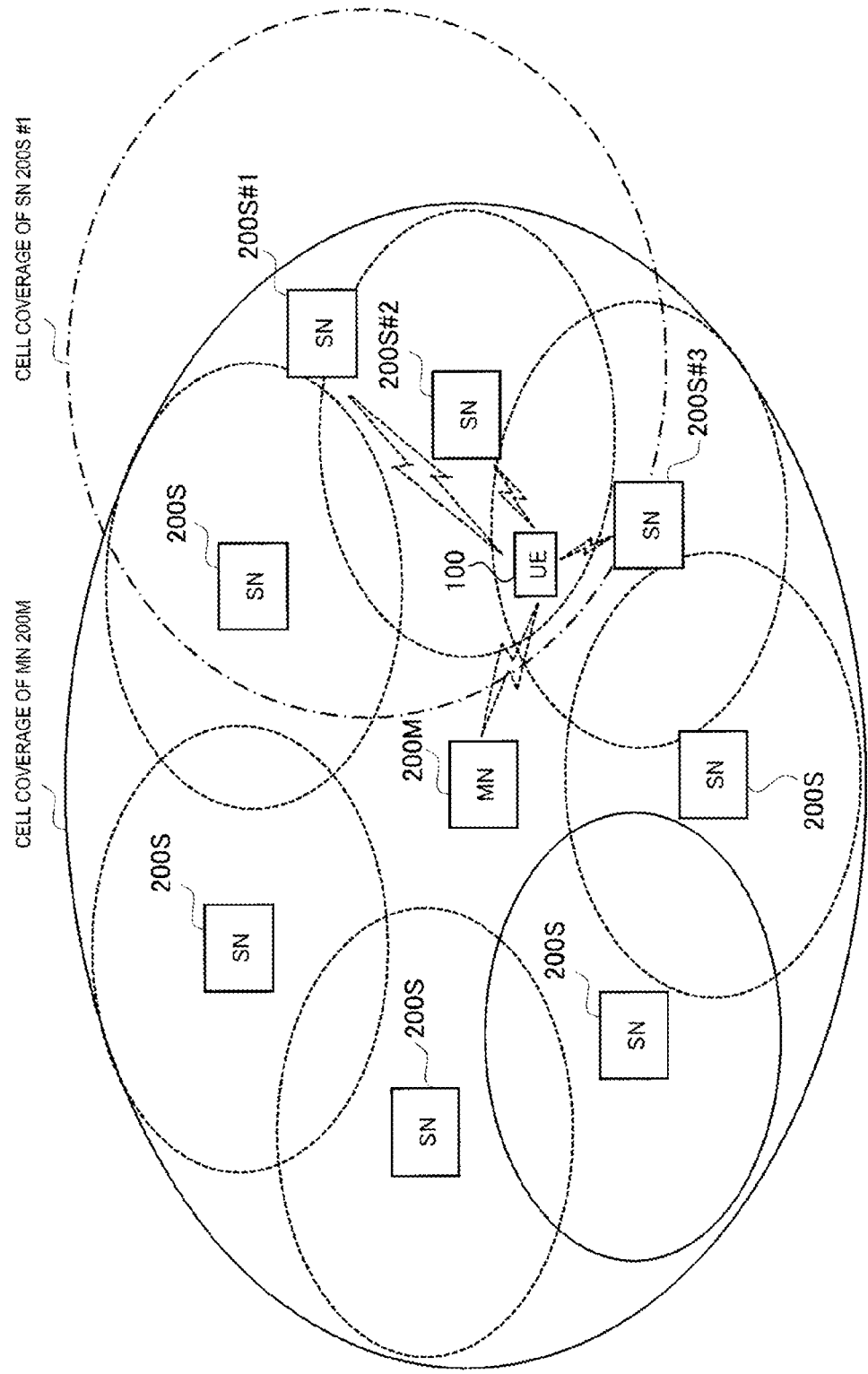
FIG. 13 is a diagram for illustrating an operation scenario for a mobile communication system according to a second embodiment.

FIG. 13 is a diagram for illustrating an operation scenario for the mobile communication system according to the second embodiment.

In the illustrated example, the UE 100 performs multi-connectivity-based wireless communication with the MN 200M and a plurality of SNs 200S (SN 200S #1 to SN 200S #3).

The SN 200S #1 has a narrower cell coverage than the MN 200M. To be more specific, the SN 200S #1 is operated at a higher frequency than the MN 200M. For example, the MN 200M may be operated in the Sub-6 band and the SN 200S #1 may be operated in the mmW band.

Each of the SN 200S #2 and the SN 200S #3 has narrower cell coverage than the SN 200S #1. To be more specific, each of the SN 200S #2 and the SN 200S #3 is operated at a higher frequency than the SN 200S #1. For example, the SN 200S #1 may be operated in the mmW band, and each of the SN 200S #2 and the SN 200S #3 may be operated in the THz band.

In such a scenario, the MN 200M causes the SN 200S #1 to perform control related to the SN 200S #2 and the SN 200S #3 (i.e., transfers the control authority to the SN 200S #1). Instead of the MN 200M, the SN 200S #1 to which the control authority is transferred performs, for the UE 100, configuration and/or control of communication between the UE 100 and the SN 200S #2 and SN 200S #3.

Figure 14:
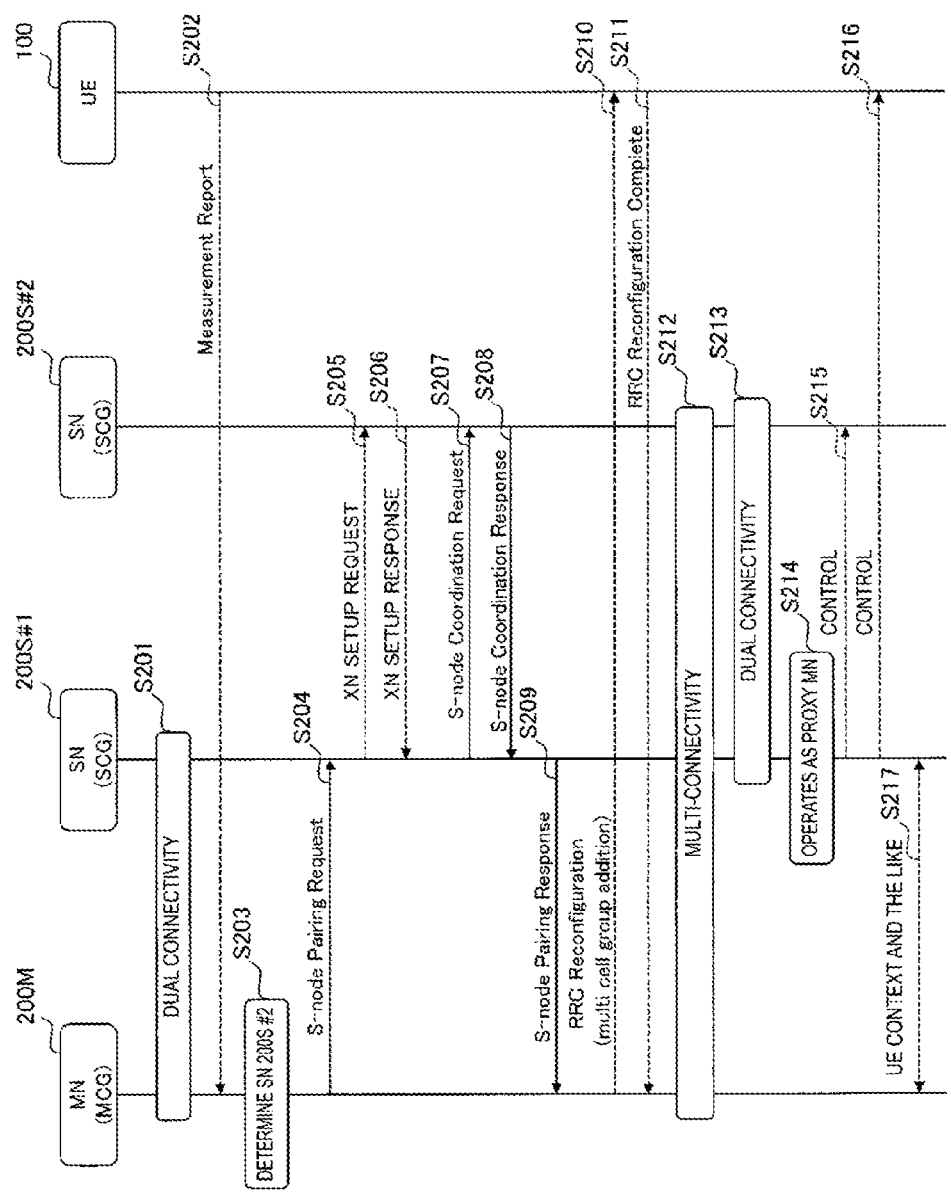
FIG. 14 is a diagram illustrating an example of operations of the mobile communication system according to the second embodiment.

FIG. 14 is a diagram illustrating an example of operations of the mobile communication system according to the second embodiment. In FIG. 14, dashed lines indicate non-essential steps.

In step S201, the UE 100 performs dual-connectivity (DC) wireless communication with the MN 200M and the SN 200S #1.

In step S202, the UE 100 may transmit, to the MN 200M, the Measurement Report message including radio quality measurement results for the respective cells. The MN 200M may receive the Measurement Report message from the UE 100.

In step S203, the MN 200M determines a combination of the SNs 200S to be operated in coordination. For example, based on the Measurement Report message in step S202, the MN 200M identifies a cell having radio quality satisfying a predetermined condition, and determines the SN 200S to which the identified cell belongs. Here, the MN 200M is assumed to have determined the SN 200S #2 as the SN 200S to be operated in coordination with the SN 200S #1. The MN 200M may determine the SN 200S #2 as the SN 200S to be operated in coordination with the SN 200S #1, based on the combination of the SN 200S (or a combination of cells) configured by the network operator (OAM). In the second embodiment, the MN 200M may determine the SN 200S #1 as the SN 200S (proxy MN) to perform control related to the SN 200S #2.

In step S204, the MN 200M transmits, to the SN 200S #1, the S-node Pairing Request message that is a request message (first message) for the coordinated operation. In the illustrated example, the MN 200M transmits the S-node Pairing Request message to the SN 200S #1. However, the MN 200M may transmit the S-node Pairing Request message to the SN 200S #2, or may transmit the S-node Pairing Request message to both the SN 200S #1 and the SN 200S #2. In the second embodiment, the S-node Pairing Request message may be an operation request to perform SN control as a proxy MN, to be specific, a message indicating that the SN 200S #1 is specified as a SN 200S (proxy MN) for performing control related to the SN 200S #2.

Note that, in the illustrated example, the coordinated operation request message (first message) is a new message transmitted and received on the inter-node interface but that the coordinated operation request message (first message) may be an existing message (for example, S-NODE MODIFICATION REQUEST message) defined in the 3GPP technical specifications. The coordinated operation request message (first message) may be a request message (for example, an S-node Xn Establishment Request message) for requesting establishment of an inter-node interface between the SNs 200S.

The request message (first message) for the coordinated operation includes at least one piece of information among 1) to 5) described above. In the second embodiment, 4) the information indicating the type of the target coordinated operation may be information indicating the "proxy MN".

In step S205, when the SN 200S #1 that has received the request message from the MN 200M includes no inter-node interface with the SN 200S #2 specified in the request message, the SN 200S #1 transmits, to the SN 200S #2, the message (for example, the XN SETUP REQUEST message) requesting establishment of the inter-node interface. When the inter-node interface with the SN 200S #2 specified in the request message is established, the SN 200S #1 need not transmit, to the SN 200S #2, the message (for example, the XN SETUP REQUEST message) for requesting establishment of the inter-node interface.

In step S206, upon receiving the message from the SN 200S #1 in step S205, the SN 200S #2 transmits, to the SN 200S #1, the response message (for example, the XN SETUP RESPONSE message) to the message. As a result, the inter-node interface is established between the SN 200S #1 and the SN 200S #2.

In step S207, upon receiving the request message from the MN 200M, the SN 200S #1 transmits the request message (for example, the S-node Coordination Request message) for starting the designated coordinated operation, to the SN 200S #2 designated in the request message. The request message includes at least one piece of information among 1) to 5) described above similarly to the message in step S204.

In step S208, upon receiving the request from the SN 200S #1 in step S207, the SN 200S #2 accepts the request and performs various configurations, and then transmits the response message (for example, the S-node Coordination Response message) to the SN 200S #1. The response message may include the RRC configuration related to SN 200S #2. The RRC configuration may include configuration information related to the cell (candidate cell) managed by SN 200S #2. The configuration information may include the configuration information of the cell, for example, the cell ID and the physical layer configuration.

In step S209, the SN 200S #1 transmits, to the MN 200M, the response message (for example, the S-node Pairing Response message) to the request message in step S204. The response message may include the RRC configuration of the SN 200S #2 (obtained in step S208) and/or the RRC configuration of the SN 200S #1.

In step S210, the MN 200M may transmit the RRC Reconfiguration message to the UE 100. Instead of the MN 200M, the SN 200S #1 may transmit the RRC Reconfiguration message to the UE 100. The RRC Reconfiguration message may include configuration information (for example, RRC configuration) related to SN 200S #1 and/or configuration information (for example, RRC configuration) related to SN 200S #2.

In step S211, the UE 100 may store the configuration information in the RRC Reconfiguration message, and transmit the RRC Reconfiguration Complete message to the MN 200M (or SN 200S #1).

In step S212, the UE 100 is configured with the SN 200S #1 and the SN 200S #2, leading to a multi-connectivity state. Here, the SN 200S #1 and the SN 200S #2 control the UE 100 in coordination.

In step S213, the SN 200S #1 achieves dual connectivity (DC) with the SN 200S #2. With the DC between the MN 200M and the SN 200S #1 configured, the DC between the SN 200S #1 and the SN 200S #2 may be configured in such a manner as to take over the DC between the MN 200M and the SN 200S #1. When there is no DC between MN 200M and SN 200S #1, or when the DC configuration between MN 200M and SN 200S #1 is discarded, the DC configuration between SN 200S #1 and SN 200S #2 may be performed as a new configuration.

In steps S214 to S216, the SN 200S #1 operates as a proxy MN and performs control related to SN 200S #2. For example, the SN 200S #1 may take the initiative in changing the PSCell of the UE 100 from the SN 200S #2 to the SN 200S #3.

In step S217, when the UE context and/or the RRC configuration held by the SN 200S #1 is updated, the SN 200S #1 may transmit the UE context and/or the RRC configuration to the MN 200M. When the MN 200M side modifies the configuration of the UE 100 to modify the UE context and/or the RRC configuration held by the MN 200M, the MN 200M may transmit the UE context and/or the RRC configuration to the SN 200S #1. Thus, synchronization processing is executed in such a manner that the MN 200M and the SN 200S #1 (proxy MN) hold the same UE context and/or RRC configuration.

Note that, in the second embodiment, the SN 200S #1, operating as the proxy MN, may transmit, to the SN 200S to be controlled (for example, the SN 200S #2), the request message for requesting to change the PSCell between the SNs 200S using the LTM according to the first embodiment.

In the second embodiment, operations same as, and/or similar to, those in the variation of the first embodiment may be applied.

(3) Other Embodiments

The operational flow of each of the embodiments described above may not be executed in chronological order according to the order described in the flow diagram. For example, the steps of operation may be performed in a different order from that described in the flow diagram or may be performed in parallel. Some steps of operation may be omitted and additional steps may be added to the process.

A program that causes the computer (the UE 100, the node 200) to perform operations according to the embodiments described above may be provided. The program may be recorded on a computer readable medium. The computer readable medium allows installation of the program on a computer. The computer readable medium on which the program is recorded may be a non-transitory recording medium. The non-transitory recording medium is not particularly limited, and may be, for example, a recording medium such as a CD-ROM or a DVD-ROM.

The phrases "based on" and "depending on/in response to" used in the present disclosure do not mean "based only on" and "only depending on/in response to," unless specifically stated otherwise. The phrase "based on" means both "based only on" and "based at least in part on". The phrase "in response to" means both "only in response to" and "at least partially in response to". The terms "include", "comprise" and variations thereof do not mean "include only items stated", but instead mean "may include only items stated" or "may include not only the items stated but also other items". The term "or" used in the present disclosure is not intended to be an exclusive OR. Any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element precedes the second element in some manner. In the present disclosure, when articles are added by translation, for example, "a", "an", and "the" in English, these articles are intended to include the plural unless the context clearly indicates otherwise.

Although embodiments have been described in detail with reference to the drawings, the specific configurations thereof are not limited to those described above and various design changes can be made without departing from the spirit of the invention.

(4) Supplements

Features relating to the embodiments described above are described below as supplements.

(Supplement 1)

A communication method for a user equipment to perform wireless communication with a master node and a plurality of secondary nodes in a mobile communication system, the communication method including:

performing, at the master node, processing of transferring, to at least one of the plurality of secondary nodes, a control authority for performing, on the user equipment, configuration and/or control related to a coordinated operation between the plurality of secondary nodes; and performing, at the secondary node to which the control authority is transferred, the configuration and/or control related to the coordinated operation on the user equipment.

(Supplement 2)

The communication method according to Supplement 1, wherein performing the processing of transferring includes transmitting a first message for requesting the coordinated operation from the master node to at least one of the plurality of secondary nodes.

(Supplement 3)

The communication method according to Supplement 2, wherein the first message includes at least one selected from the group consisting of a user equipment identifier for identifying the user equipment, a node identifier for identifying a secondary node that is a partner of the coordinated operation, a cell identifier for identifying a cell of the secondary node that is the partner of the coordinated operation, a type identifier indicating a type of the coordinated operation, and a user equipment context for the user equipment.

(Supplement 4)

The communication method according to Supplement 2 or 3, including:

transmitting, at the first secondary node that has received the first message, a second message for starting the coordinated operation to the second secondary node.

(Supplement 5)

The communication method according to any one of Supplements 1 to 4, wherein the plurality of secondary nodes includes a first secondary node to which the control authority is transferred and a second secondary node, and the coordinated operation includes a cell switching operation of switching a serving cell of the user equipment from a cell of the first secondary node to a cell of the second secondary node.

(Supplement 6)

The communication method according to Supplement 5, wherein performing the configuration and/or control related to the coordinated operation includes performing, at the first secondary node, configuration and/or control of the cell switching operation on the user equipment by using signaling of layer 1 and/or layer 2.

(Supplement 7)

The communication method according to any one of Supplements 1 to 6, wherein the plurality of secondary nodes includes a first secondary node to which the control authority is transferred and a second secondary node, and performing the configuration and/or control related to the coordinated operation includes performing, at the first secondary node on behalf of the master node, configuration and/or control of communication between the user equipment and the second secondary node, on the user equipment.

(Supplement 8)

A node for operating as a master node in a mobile communication system in which a user equipment performs wireless communication with the master node and a plurality of secondary nodes, the node including:

a controller configured to perform processing of transferring, to at least one of the plurality of secondary nodes, a control authority for performing, on a user equipment, configuration and/or control related to a coordinated operation between the plurality of secondary nodes.

(Supplement 9)

A node for operating as a secondary node in a mobile communication system in which a user equipment performs wireless communication with a master node and a plurality of secondary nodes, the node including:

a controller configured to perform, on the user equipment, configuration and/or control related to a coordinated operation between the plurality of secondary nodes when a control authority for performing, on the user equipment, the configuration and/or control related to the coordinated operation is transferred from the master node to the node.

(Supplement 10)

A user equipment for performing wireless communication with a master node and a plurality of secondary nodes, the user equipment including:

a wireless communicator configured to receive a signal for configuration and/or control related to a coordinated operation between the plurality of secondary nodes from a secondary node to which a control authority for performing, on the user equipment, the configuration and/or control related to the coordinated operation is transferred from the master node.

REFERENCE SIGNS

1: NW
10: RAN
20: CN
100: UE
110: Receiver
120: Transmitter 130: Controller
140: Wireless communicator
200: Node
200M: MN
200S: SN
210: Transmitter
220: Receiver
230: Controller
240: NW communicator
250: Wireless communicator
300: CN device

The invention claimed is:

1. A communication method for a multi-connectivity in which a user equipment performs wireless communication with a master node and a plurality of secondary nodes in a mobile communication system, the communication method comprising:

performing, at the master node, processing of transferring, to at least one of the plurality of secondary nodes used in the multi-connectivity, a control authority for performing, on the user equipment, configuration and/or control related to a coordinated operation between the plurality of secondary nodes used in the multi-connectivity;

maintaining a role of the master node after the processing of transferring the control authority; and performing, at the secondary node to which the control authority is transferred, the configuration and/or control related to the coordinated operation on the user equipment.

2. The communication method according to claim 1, wherein performing the processing of transferring comprises transmitting a first message for requesting the coordinated operation from the master node to at least one of the plurality of secondary nodes.

3. The communication method according to claim 2, wherein the first message comprises at least one selected from the group consisting of a user equipment identifier for identifying the user equipment, a node identifier for identifying a secondary node that is a partner of the coordinated operation, a cell identifier for identifying a cell of the secondary node that is the partner of the coordinated operation, a type identifier indicating a type of the coordinated operation, and a user equipment context for the user equipment.

4. The communication method according to claim 2, comprising:

transmitting, at the first secondary node that has received the first message, a second message for starting the coordinated operation to the second secondary node.

5. The communication method according to claim 1, wherein the plurality of secondary nodes comprises a first secondary node to which the control authority is transferred and a second secondary node, and the coordinated operation comprises a cell switching operation of switching a serving cell of the user equipment from a cell of the first secondary node to a cell of the second secondary node.

6. The communication method according to claim 5, wherein performing the configuration and/or control related to the coordinated operation comprises performing, at the first secondary node, configuration and/or control of the cell switching operation on the user equipment by using signaling of layer 1 and/or layer 2.

7. The communication method according to claim 1, wherein the plurality of secondary nodes comprises a first secondary node to which the control authority is transferred and a second secondary node, and performing the configuration and/or control related to the coordinated operation comprises performing, at the first secondary node on behalf of the master node, configuration and/or control of communication between the user equipment and the second secondary node, on the user equipment.

8. A node for operating as a master node in a mobile communication system for a multi-connectivity in which a user equipment performs wireless communication with the master node and a plurality of secondary nodes, the node comprising:

a controller configured to perform processing of transferring, to at least one of the plurality of secondary nodes used in the multi-connectivity, a control authority for performing, on a user equipment, configuration and/or control related to a coordinated operation between the plurality of secondary nodes used in the multi-connectivity; and maintain a role of the master node after processing of transferring the control authority.

9. A node for operating as a secondary node in a mobile communication system for a multi-connectivity in which a user equipment performs wireless communication with a master node and a plurality of secondary nodes, the node comprising:

a controller configured to perform, on the user equipment, configuration and/or control related to a coordinated operation between the plurality of secondary nodes used in the multi-connectivity when a control authority for performing, on the user equipment, the configuration and/or control related to the coordinated operation is transferred from the master node to the node; and maintain a role of the master node after processing of transferring the control authority.

10. A user equipment for performing wireless communication of a multi-connectivity with a master node and a plurality of secondary nodes, the user equipment comprising:

a wireless communicator configured to receive a signal for configuration and/or control related to a coordinated operation between the plurality of secondary nodes used in the multi-connectivity from a secondary node to which a control authority for performing, on the user equipment, the configuration and/or control related to the coordinated operation is transferred from the master node; and maintain a role of the master node after processing of transferring the control authority.

* * * * *